United States Patent
Baur

(10) Patent No.: US 6,172,668 B1
(45) Date of Patent: Jan. 9, 2001

(54) LIGHT PEN

(75) Inventor: Peter F. Baur, Augsburg (DE)

(73) Assignee: NCR Corporation, Dayton, OH (US)

( * ) Notice: Under 35 U.S.C. 154(b), the term of this patent shall be extended for 0 days.

(21) Appl. No.: 08/133,713

(22) Filed: Oct. 8, 1993

(30) Foreign Application Priority Data

Oct. 15, 1992 (GB) .................................................. 9221629

(51) Int. Cl.⁷ .................................................. G09G 3/28
(52) U.S. Cl. .......................................... 345/182; 345/180
(58) Field of Search .................................. 345/180, 181, 345/182, 183, 179, 173, 175, 176; 252/301.36; 178/18.01, 18.1, 18.11, 19.01, 19.05

(56) References Cited

U.S. PATENT DOCUMENTS

| | | | |
|---|---|---|---|
| 2,553,245 | * | 5/1951 | Espenchied .......................... 345/181 |
| 4,800,257 | * | 1/1989 | Johner . |
| 5,083,120 | * | 1/1992 | Nelson ................................... 345/102 |
| 5,116,533 | * | 5/1992 | Grandmont et al. ............. 252/301.36 |

FOREIGN PATENT DOCUMENTS

| | | | | |
|---|---|---|---|---|
| 59053974 | * | 3/1984 | (JP) . | |
| 59-053974 | * | 7/1984 | (JP) . | |
| 2219086 | * | 8/1990 | (JP) | ...................................... 345/182 |

* cited by examiner

Primary Examiner—Xiao Wu

(57) ABSTRACT

A light pen for a computer having an elongated body member which contains a photoluminescent material (PLM). The PLM absorbs ambient light of one wavelength, and radiates light of another wavelength in response. The radiated light is directed so as to be projected from a tip of the light pen as required.

13 Claims, 6 Drawing Sheets $r \geq 3a$

LIGHT PEN

The present invention relates to a pen-like device having a light output, hereinafter referred to as a light pen.

BACKGROUND OF THE INVENTION

Light pens are commonly used as input devices for data processing and storage systems in place of conventional keyboards and mouse devices. A light pen is used in combination with a display screen incorporating a photosensitive digitizer or photosensitive sheet material. As such, information can be input by writing with the light pen on the screen and typically the screen displays the instantaneous position, and path of movement, of the pen. In this way, the screen displays the pattern, e.g. a written message, sketch or signature traced thereon.

The light source for known light pens disadvantageously comprises a relatively fragile lamp or L.E.D. which can readily suffer damage if the pen is dropped. The light source is powered either by way of a power supply cord or cable or by way of a battery if a "cordless" light pen is required. The power is supplied by way of electrical connections which may also be fragile and prone to breakage if the pen is dropped or otherwise misused. Such components are generally expensive to purchase and assemble.

Cordless light pens are advantageous in that the movement and use of the pen is not impaired by a cord which can easily become snagged or otherwise interfere with the light pen. Also, a single cordless light pen can be used with a plurality of digitizer units, or other devices, since the pen is not anchored to one unit by a power supply cord.

However, known cordless light pens suffer particular disadvantages in that a battery must be provided for its use, which increases the operating cost of such pens. If a replaceable battery is used, this further increases the cost and also makes operation of the pen dependent on the availability of a replacement battery. If a re-chargeable battery is employed this may also lead to an increase in the "down time" for the pen, i.e. the period during which the pen can not be used.

OBJECTS OF THE INVENTION

It is an object of the present invention to provide a new and improved light pen for use as a data input device.

It is another object of the present invention to provide a light pen which does not require a lamp for generating a light output.

It is a further object of the present invention to provide a "cordless" light pen which does not require a battery.

It is yet another object of the present invention to provide a light pen which is light weight, mobile and has improved durability.

It is yet a further object of the present invention to provide a light pen which is less costly to operate than those of the prior art.

It is still another object of the present invention to provide a light pen which eliminates the "down time" experienced by known light pens.

It is still a further object of the present invention to provide a light pen which does not require electrical connections and relatively fragile components.

It is another object of the present invention to provide a light pen having improved mechanical strength, and thus resistance to accidental damage.

SUMMARY OF THE INVENTION

According to the present invention there is provided a light pen having an elongated body member with a tip from which light is output. The body member includes photoluminescent material, whereby light radiated by the photoluminescent material in response to external light is directed by a process of internal reflection to the tip for output therefrom.

DESCRIPTION OF A PREFERRED EMBODIMENT

Figure 1:
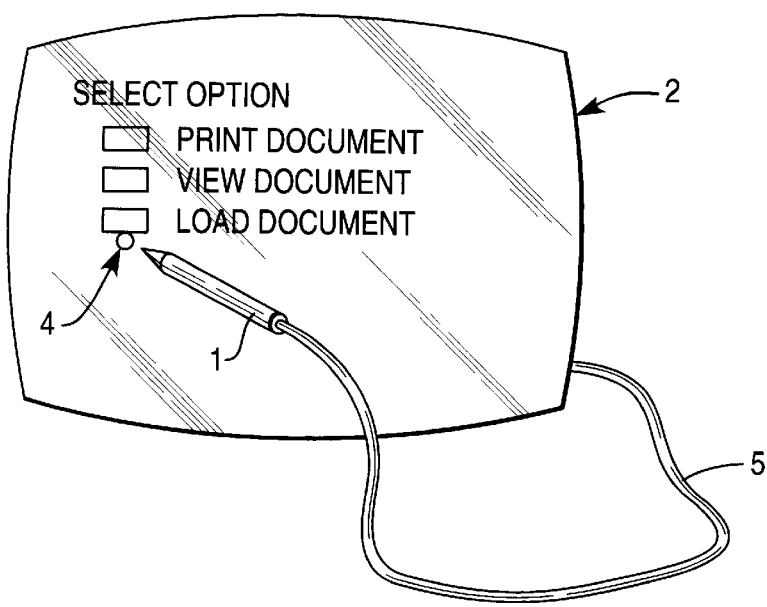
FIG. 1 illustrates the use of a known light pen for generating an input to a computer.

One type of known light pen is shown in FIG. 1. The pen 1 illuminates a spot 4, thereby allowing a computer to obtain data from the pen, based on the position of the spot. For example, the display may show a series of boxes, as indicated, each of which indicates a different option for the user to select. The user selects an option by placing the spot of light into the proper box. The display detects which box contains the light spot, and thus recognizes the choice made by the user.

Figure 2:
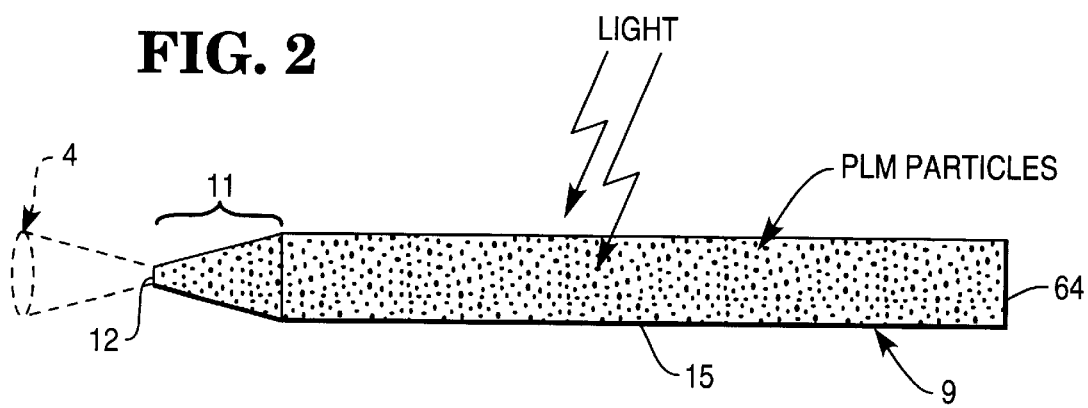
FIG. 2 illustrates a light pen according to one embodiment of the present invention.

FIG. 2 shows a light pen according to one form of the present invention. The light pen includes a rod 9, constructed of a transparent material, polymethyl methacrylate (PMMA), containing particles of a photoluminescent material (PLM). The PLM absorbs ambient light, as indicated. The absorption promotes electrons in the PLM to higher energy states which then fall to lower states, causing the PLM to radiate light. Part of the radiated light is reflected internally at the interface between the rod 9 and air so as to travel towards a beveled end 11 of the rod, where it exits through a facet 12 forming the tip of the beveled end 11.

In order to increase the absorption of ambient light, an anti-reflective coating is applied to the external surface 15 of the pen. Also, a reflective coating can be employed on the end 64 of the pen opposite the tip 12 so as to direct light, traveling away from the tip, back towards the tip.

Alternatively, the rod can be given a coating which acts as a high-pass filter. The incoming light will be of a shorter wavelength, and thus higher frequency, than the radiated light. The filter is transparent to the higher frequencies but blocks the radiated, lower frequencies and so enhances the total internal reflection within the pen.

Figure 3:
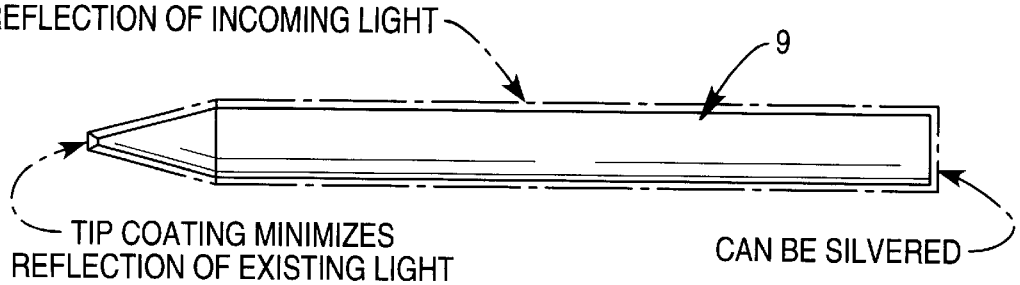
FIG. 3 illustrates the use of two different types of anti-reflective coatings, namely, on the body of the light pen of FIG. 2 and at the tip of the light pen of FIG. 2.

The tip facet 12 of the pen in FIG. 2 may also be coated with a dielectric coating so as to maximize transmission. That is, the tip is coated to maximize transmission from the inside of the pen to the outside, and the body of the pen is coated to maximize transmission in the opposite direction namely from the outside to the inside of the pen. FIG. 3 illustrates this distinction.

Figure 4:
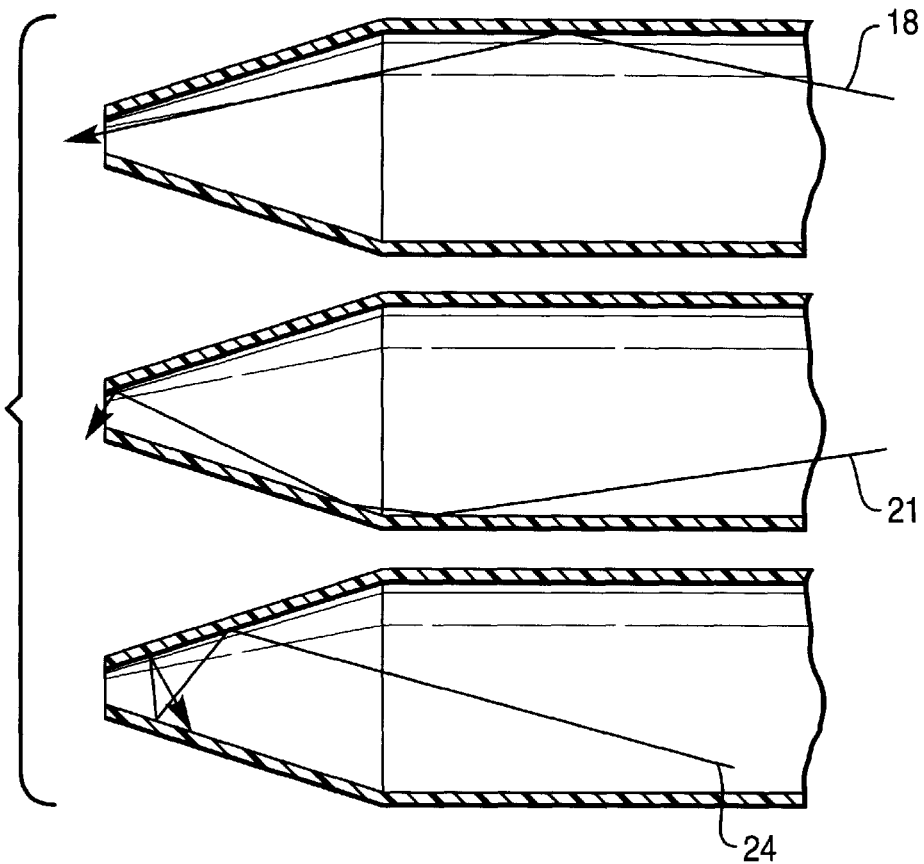
FIG. 4 illustrates how some rays escape from the light pen of FIG. 2.

As indicated in FIG. 4 a beveled, conical end may not produce the light intensity required for a particular use. In general, for a reflected ray, the angle of incidence equals the angle of reflection. Rays 18 and 21 are reflected accordingly, and successfully escape the rod. However, ray 24 does not, and is reflected back into the rod.

If the apparatus employing the light pen requires a greater output then alternative embodiments of the invention could be used as discussed below.

Figure 5A:
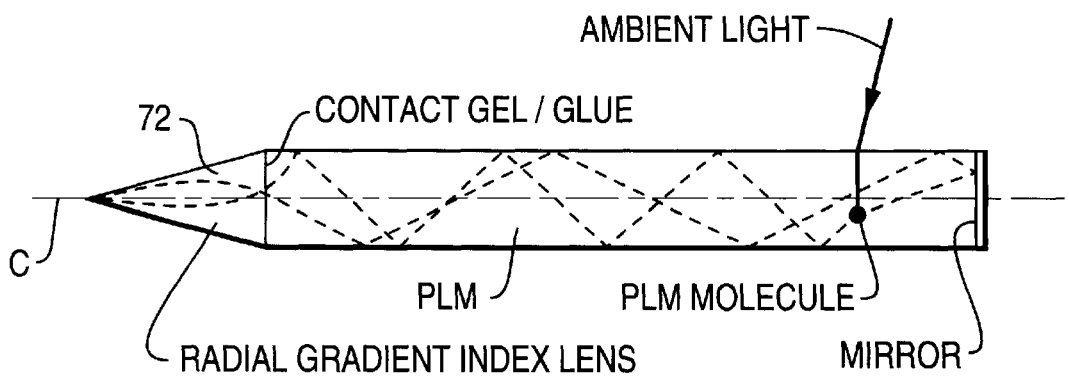
FIG. 5A illustrates a radial-gradient-index lens for use with a light pen embodying the present invention.

A gradient-index lens could be used, as shown in FIG. 5A. The refractive index of this lens 72 is greater near the center than near the surface, as indicated in Figure SC. This type of change in refractive index causes the rays to follow the beveled tip, until they can escape at the very end of the tip. That is, the rays are continually bent towards the centerline C as they progress towards the tip.

Figure 6:
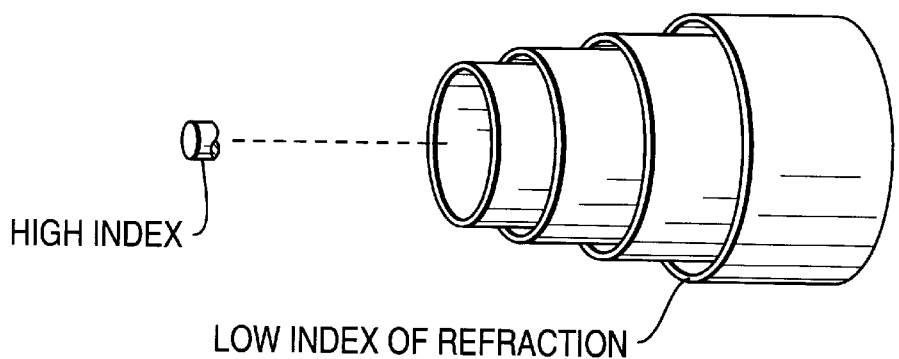
FIG. 6 illustrates one way to construct the radial-gradient-lens of FIG. 5A.

One way to construct such a gradient-index cone is shown in FIG. 6. First, concentric cylinders of materials having different indices of refraction are assembled into a solid cylinder. Then, the solid cylinder is machined into a cone and the cone is then fastened to the rod using an adhesive.

Figure 5B:
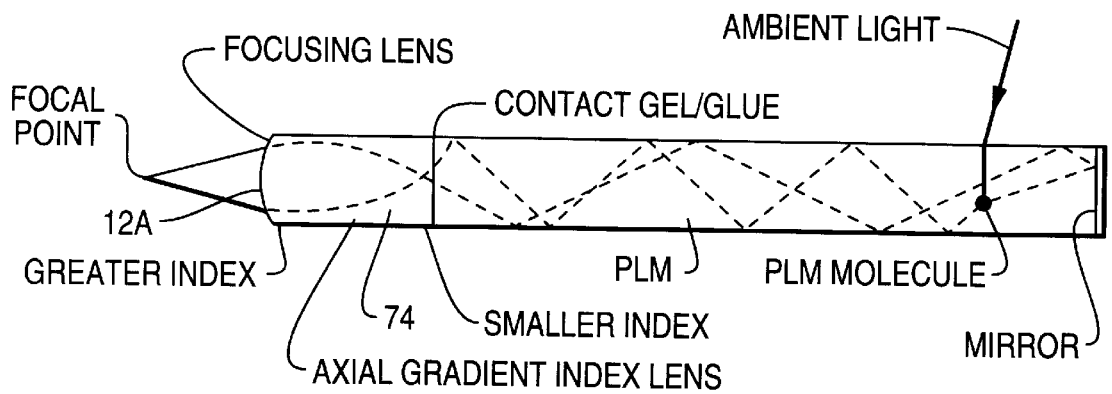
FIG. 5B illustrates an axial-gradient-index lens for use with a light pen embodying the present invention.
Figure 5C:
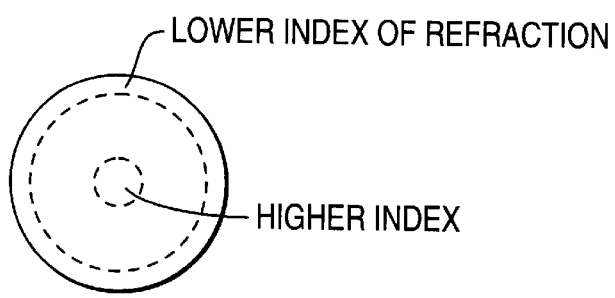
FIG. 5C illustrates a "radial gradient."
Figure 5D:
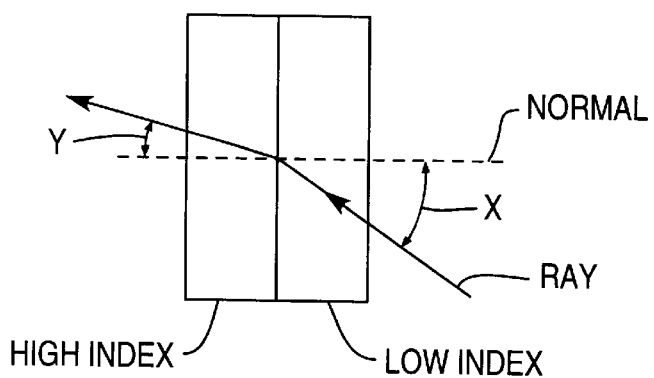
FIG. 5D illustrates the refraction of a light ray passing between materials of different refractive indices.

An axial gradient-index-lens 74 can be used, as indicated in FIG. 5B. In this case, the index of refraction is greater close to the end 12A as indicated. The operation can be visualized by considering the gradient region as divided into sections, two of which are shown in FIG. 5D. Each ray is bent towards the line marked NORMAL (i.e., the line perpendicular to the interface); angle X is greater than angle Y. Thus, the axial gradient of the lens of FIG. 5B directs the rays into substantially parallel configuration, which is parallel with the optical axis of the rod.

Figure 7A:
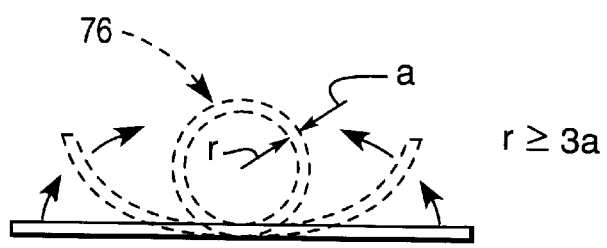
FIGS. 7A and 7B illustrate a light pen according to a further embodiment of the present invention.
Figure 7B:
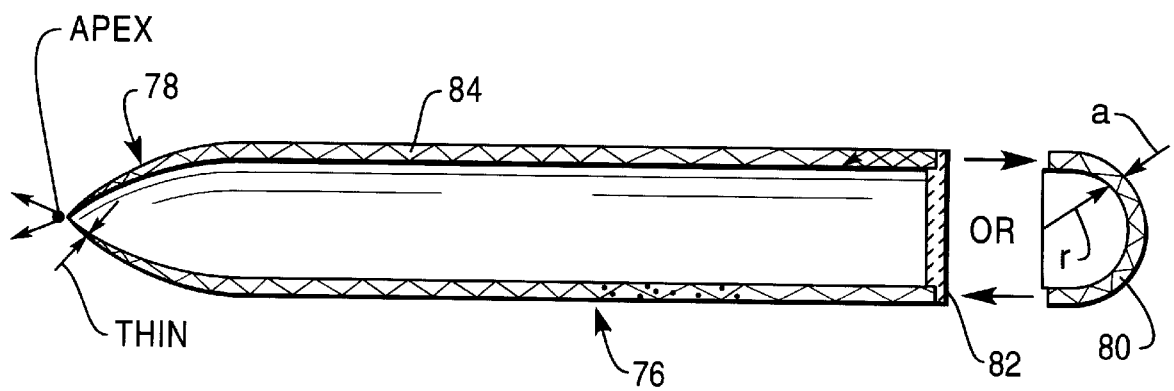

Another embodiment for increasing the light output is shown in FIG. 7B. In general, a plate containing the PLM does not change its internal reflection characteristics when rolled to form a wall 84 of a tube 76, as in FIG. 7A, so long as r (the radius) is equal to or greater than $3a$ (a is the tube wall thickness, as indicated).

Under these conditions, the diameter of the tube 76 can be continuously reduced toward one end to form a tip 78, thus providing the desired concentration of light. That is, as the diameter decreases, and thus "r" decreases, the wall thickness decreases as the tip 78 is approached. The end opposite the tip 78 can be terminated by a hemispherical cap 80 or a plane mirror 82, as indicated. Light rays which are not absorbed by the PLM during passage through the wall 84 and into the tube 76 may be absorbed as they again pass through the wall 84 on their passage towards the outside of the tube.

As a further alternative, the tube 76 and cone 78 of FIG. 7B could be filled with a solid or liquid material, provided such material has a lower refractive index than that of the tube wall 84.

The discussion above assumes particles of a photoluminescent material suspended in PMMA. The PMMA acts as a matrix material which supports the particles. However, it is not necessary to use PMMA as the supporting matrix; other transparent materials can be used. Further, the photoluminescent material need not be a particulate, but can, for example, be a liquid which is suspended in the matrix. Still further, the PLM can take the form of a solid in solution, or in suspension, in the matrix.

Photoluminescence is understood to occur by the following sequence of events: a material absorbs a photon, which creates an electron-hole pair (EHP) and, when the electron and hole recombine, light is radiated.

If the recombination is relatively fast, the process is termed "fluorescence" and if the recombination is relatively slow the process is called "phosphorescence."

Table 1 identifies several of the suitable PLMs which can be used.

TABLE 1

| Photoluminescent Material | EHP Mean Lifetime | Absorption max | Emission max |
| --- | --- | --- | --- |
| PERYLENE 083 | $4.10^{-9}$ sec | 476 nm | 490 nm |
| PERYLENE 240 | " | 524 nm | 539 nm |
| PERYLENE 300 | " | 578 nm | 613 nm |
| NAPHTALIMIDE 570 | " | 378 nm | 413 nm |

It may be desirable to combine a PLM which exhibits fluorescence with one which exhibits phosphorescence, in order to allow the pen to store light, and then project light after the incoming light becomes dimmer. For example, when the light pen is held in the hand, the incoming light is reduced, because the hand shadows the pen. If the pen contains only a fluorescent PLM, then the light projected by the pen will also be reduced.

Figure 8:
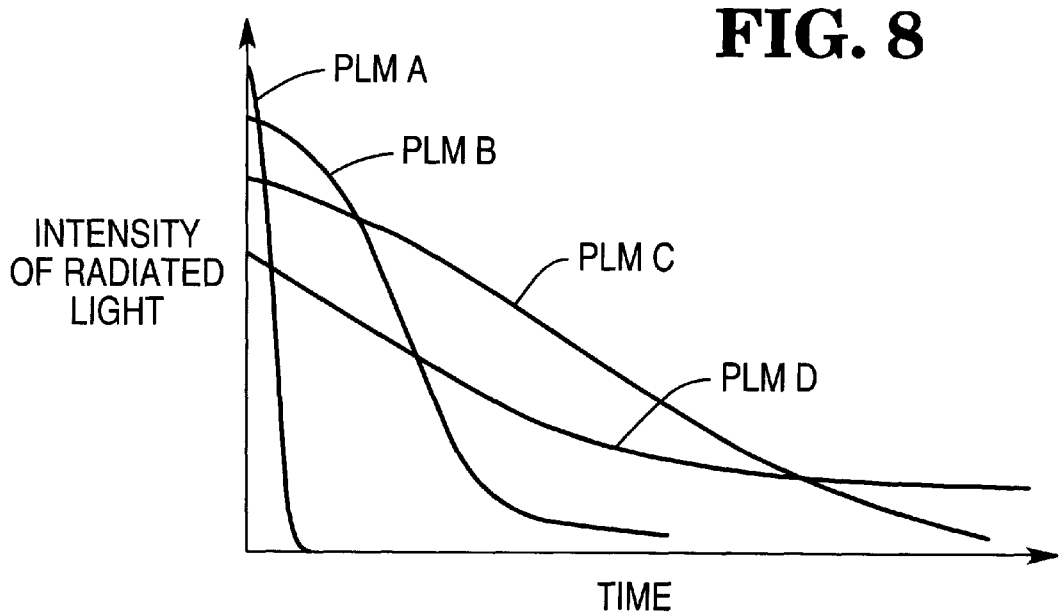
FIG. 8 illustrates intensity-versus-time plots of various photoluminescent materials.

If the particular application of the light pen requires that the light output should not decrease in the manner outlined above, the pen can contain several PLMs which exhibit radiation output curves of the type illustrated in FIG. 8. Some of the PLMs deplete their stored energy rapidly (i.e. those which fluoresce), and some take a longer time for depletion (i.e., those which phosphoresce). As such, the phosphorescent materials act as light-storage agents.

Figure 9:
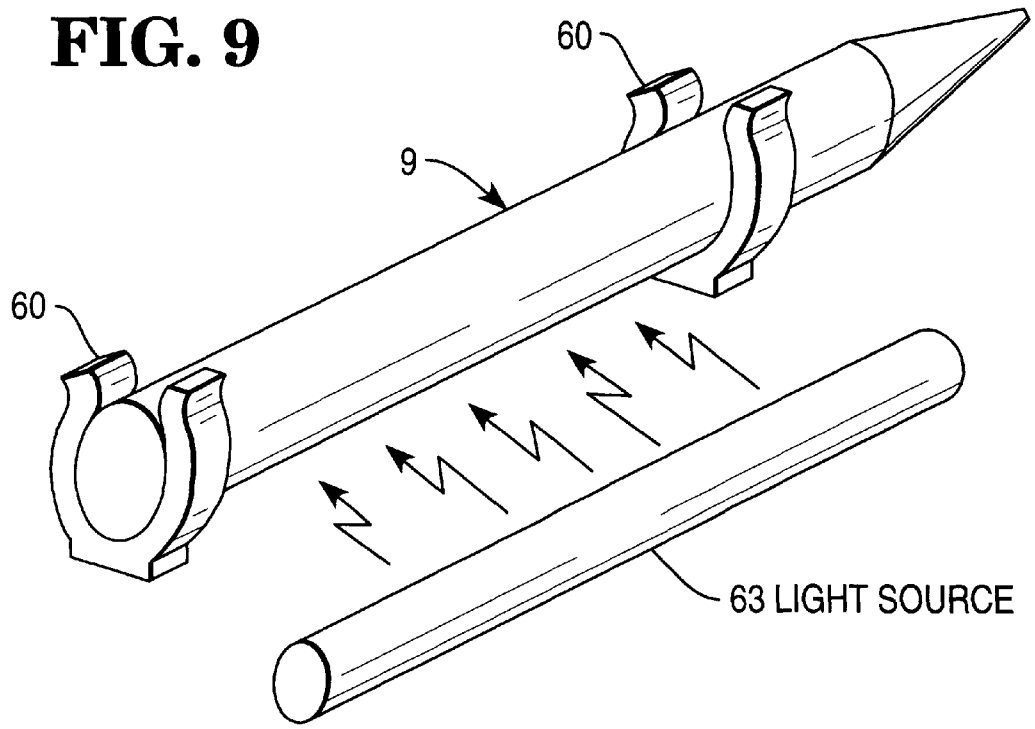
FIG. 9 illustrates a stand, and a light source, for charging a light pen embodying the present invention.

As FIG. 9 shows, a cradle 60 can be provided within which the light pen can rest. The pen snap-fits into the cradle. The cradle can contain a light source 63 which may also provide light which is more intense than ambient light, thus charging the multi-PLM light pen with more energy than would ambient light, or charging with the same energy in a shorter time.

Figure 10:
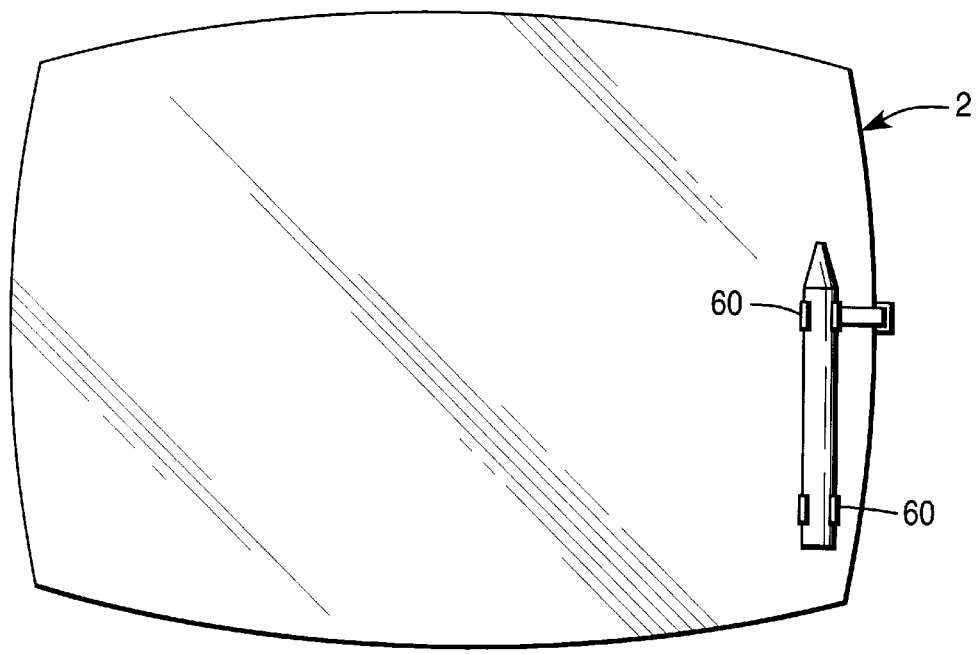
FIG. 10 illustrates how a video display can be used as a light source for charging a light pen embodying the present invention.

If the device in which the pen is used has a light-producing display 2, the display can be employed to provide the light required to charge the light pen. The cradle can be located adjacent the display, as in FIG. 10. The computer is programmed, in a manner known in the art, to illuminate a region of the display with the appropriate color, for charging the pen. For example, a white rectangle similar in size to the longitudinal cross-section of the pen, can be employed for charging it.

The use of two pens is also advantageous in that the additional pen is charged, while the other pen is being used. When the pen in use has exhausted its charge, the pens can be exchanged.

Figure 11:
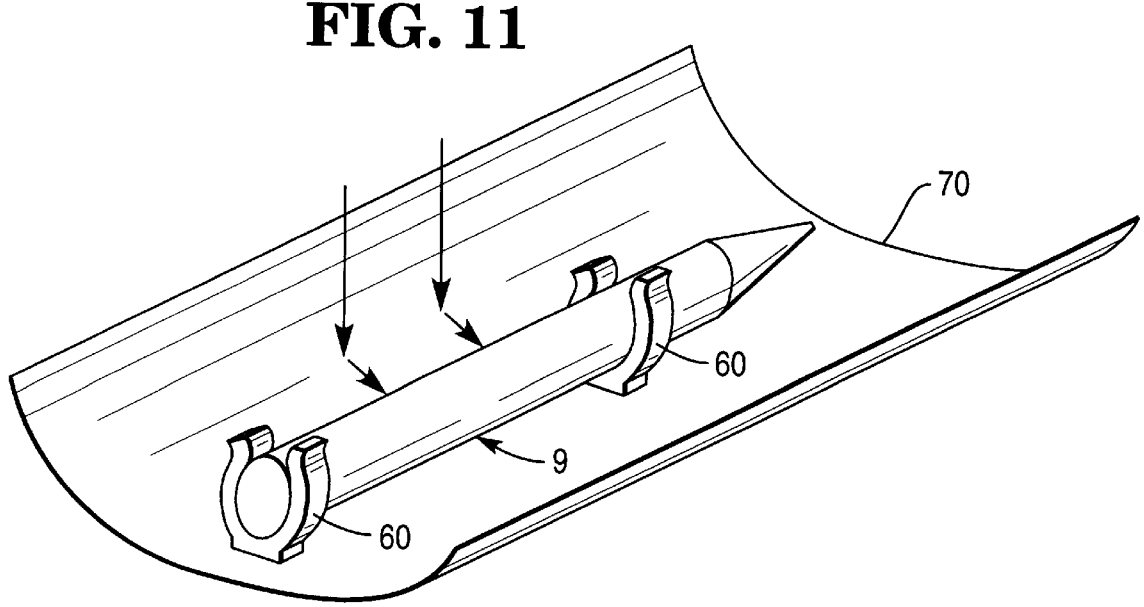
FIG. 11 illustrates a reflector for use in charging a light pen embodying the present invention.

Further, the charging holder can take the form of a reflector 70 which concentrates ambient light, as indicated in FIG. 11.

It will be clear to those skilled in the art that the present invention is not limited to the specific embodiment disclosed and illustrated herein. It will be understood that the dimensions and proportional and structural relationships shown in the drawings are illustrated by way of example only and these illustrations are not to be taken as the actual dimensions or proportional structural relationships used in the light pen of the present invention.

Numerous modifications, variations, and full and partial equivalents can be undertaken without departing from the invention as limited only by the spirit and scope of the appended claims.

What is desired to be secured by Letters Patent is as follows.

What is claimed is:

1. A light pen having an elongated body member with a tip from which light is output, wherein:

said body member includes photoluminescent material, and light radiated by said photoluminescent material in response to external light is directed by a process of internal reflection to said tip for output therefrom.

2. A light pen according to claim 1 wherein said body member is transparent.

3. A light pen according to claim 1, wherein said body member comprises a solid body member having a lens with a graded refractive index adjacent said tip.

4. A light pen according to claim 3, wherein said lens has an optical axis; and the refractive index of said lens is graded in a direction perpendicular to said optical axis.

5. A light pen according to claim 3, wherein:

said lens has an optical axis; and the refractive index of said lens is graded in the direction of said optical axis.

6. A light pen according to claim 1, wherein said body member comprises a hollow body member having a wall member including said photoluminescent material.

7. A light pen according to claim 6, wherein said wall member is tapered at one end so as to form said tip.

8. A light pen according to claim 1, wherein said body member includes a first photoluminescent material which is fluorescent and a second photoluminescent material which is phosphorescent.

9. A light pen according to claim 1, wherein the outer surface of said body member is arranged to receive external light for exciting said photoluminescent material.

10. A light pen according to claim 1, wherein the outer surface of said body member is coated with a material to enhance the total internal reflection of the light radiated by said photoluminescent material.

11. A light pen according to claim 1, wherein said body member is formed of a transparent plastic material having particles of photoluminescent material embedded therein.

12. A light pin according to claim 10 wherein the radiated light is directed to said tip by reflecting the radiate light from said body to said tip.

13. A light pen according to claim 12 wherein said body includes photoluminescent material which absorbs external light and radiates light internally to said pen.

* * * * *